April 21, 1925.  
E. F. BEGTRUP  
1,534,022  
MEANS FOR PLUGGING AUXILIARY GATES OF MOLDS  
Filed Aug. 15, 1923
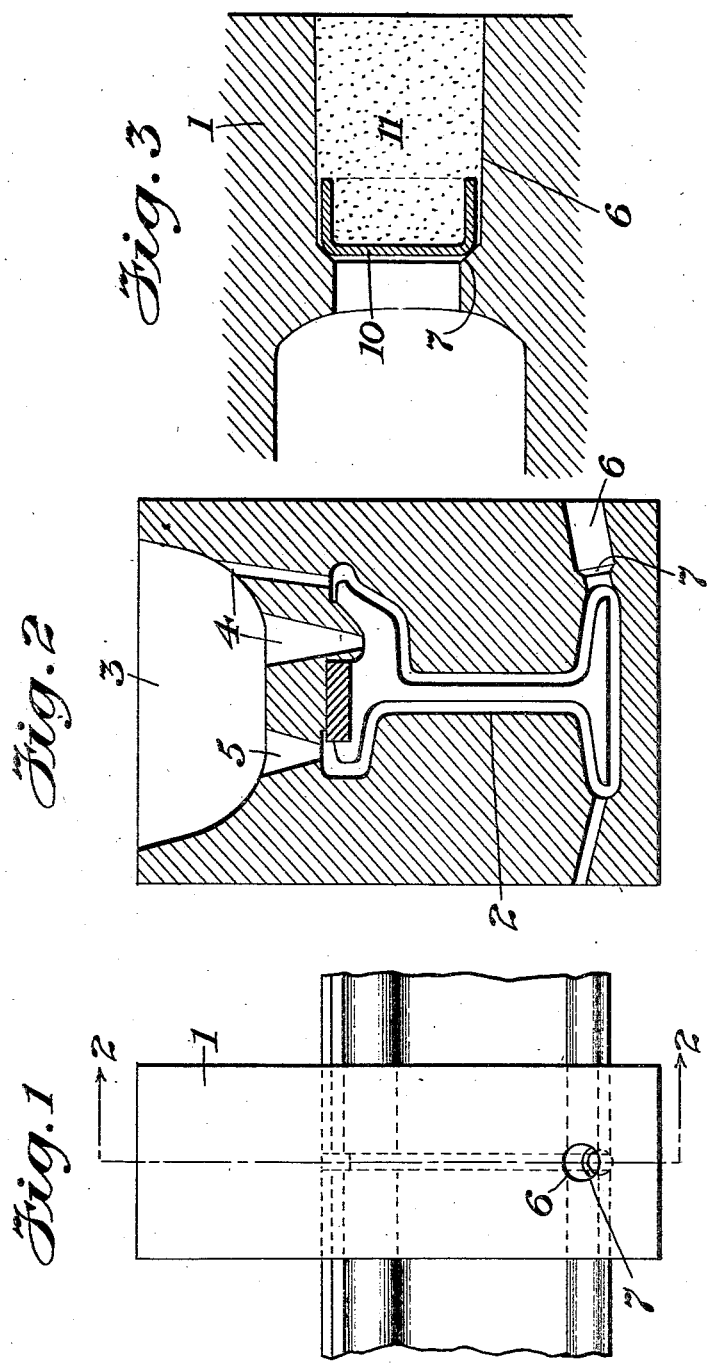
INVENTOR  
Edward F. Begtrup  
BY  
HIS ATTORNEY Patented Apr. 21, 1925.

1,534,022

UNITED STATES PATENT OFFICE.

EDWARD F. BEGTRUP, OF JERSEY CITY, NEW JERSEY, ASSIGNOR TO METAL & THERMIT CORPORATION, OF CHROME, NEW JERSEY, A CORPORATION OF NEW JERSEY.

MEANS FOR PLUGGING AUXILIARY GATES OF MOLDS.

Application filed August 15, 1923. Serial No. 657,528.

*To all whom it may concern:*

Be it known that I, EDWARD F. BEGTRUP, a citizen of the United States, and a resident of Jersey City, in the county of Hudson and State of New Jersey, have invented certain new and useful Improvements in Means for Plugging Auxiliary Gates of Molds; and I do hereby declare the following to be a full, clear, and exact description of the invention, such as will enable others skilled in the art to which it appertains to make and use the same.

The invention relates to a novel means for plugging auxiliary gates, such as the preheating gates of molds, usually employed in effecting the welding together of metal parts, as for example, by the thermit process; the object of the invention being to provide a simple and effective means for sealing the gates against egress of the hot metal during the subsequent casting operation, by the application of a plugging device of solid resistant material, and of suitable form to be fitted within the gate, with or without the addition of tamped molding materials, such as sand, backing up the plugging device.

The invention is illustrated in the accompanying drawings, in which:

Fig. 1 is a side elevation of a mold for effecting a thermit weld between the ends of two rails, showing the usual location of the preheating gate;

Fig. 2 is a section on line 2—2 of Fig. 1;

Fig. 3 is an enlarged horizontal section through the preheating gate showing the plugging means applied thereto.

In making thermit and similar welds by the casting process, it is customary to enclose the parts to be joined, whether they be separate elements or the parts of a fractured element, in a sand and clay mold having an internal space or cavity which defines the size and shape of the casting by means of which the weld is effected, which space or cavity also serves as a preheating chamber to permit the parts to be welded to be raised to a suitable temperature by the introduction of a hot flame, such as that of an acetylene or oxy-hydrogen torch or blow pipe, which flame is introduced into the mold cavity by way of an auxiliary gate, usually formed in the lower part of the mold. After the parts to be welded and the interior of the mold cavity have been preheated, it is necessary, before pouring the welding metal, such as thermit steel, to plug or seal the heating gate. This sealing of the heating gate heretofore has usually been effected by means of a sand core inserted in the gate and, in turn, backed up by loose sand or other molding material. Such a mode of plugging or sealing has proven unsatisfactory for a number of reasons, among which may be included the liability of sand breaking away from the inner end of the core and contaminating the metal in the weld; the possibility of the sand core absorbing moisture and causing the molten metal to blow out, due to the generation of steam; the difficulty of procuring a sufficiently tight fit of the sand core in the gate with the consequent danger of the highly fluid metal escaping from the mold through even relatively small openings between the core and wall of the gate and the resultant liability of the hot metal coming into contact with the damp molding sand in the outer portion of the mold, which would generate steam and produce a blow out of the metal and a possible disruption of the mold; and the practical impossibility of determining with any exactness the extent of projection of the sand core into the gate, and possibly into the mold cavity, when the core has been tamped in tight. In order to forestall or obviate some of the foregoing difficulties, it has been the custom to provide an additional backing tray which extends away from the mold directly in line with the heating gate to permit an additional backing of the sand core to prevent run-outs. The present invention is designed to overcome the difficulties and dangers aforesaid without the employment of the usual makeshift expedients, but, on the contrary, to provide an effective sealing means which will be accurately positioned and firmly retained in the gate without in any way impairing the normal action of the welding metal.

Referring to the accompanying drawings, 1 is a graphic illustration of the usual form of sand and clay mold which is clamped in position about the ends of two metallic sections, such as railway rails, which are to be connected by a thermit or similar weld. The mold is provided with a central cavity 2 into which the parts to be welded project, leaving a sufficient space between the walls of the cavity and the adjacent surfaces of the metal sections to receive the highly molten casting metal and to define the extent of the cast joint. The upper portion of the mold is provided with the usual basin 3 which communicates with the mold cavity by means of gates or openings 4 and 5. As is customary, the mold is provided with a gate 6, near the lower end thereof, which communicates with the lower portion of the mold cavity, said gate being employed for the introduction of the flame from a heating torch or blow pipe of the type hereinbefore referred to, for the purpose of preheating the ends of the metallic sections to be welded and also to throughly dry the interior of the mold cavity and the adjacent sections of the body of the mold. Preferably, the heating gate 6 is provided with an enlarged outer bore, which is connected with the smaller inner bore by an interior shoulder 7. Fitting snugly within the enlarged bore of the gate 6 is a plug of resistant material, preferably metal, which abuts and rests against the shoulder 7, and if desired, the outer portion of the gate may be filled with tamped molding sand or similar material to hold the initial plugging means firmly in position and to thoroughly seal the entire gate against the egress of metal, beyond the usual sprue section, which is defined by the portion of the gate on the inner side of the initial sealing element. Preferably, the initial sealing element takes the form of a cup 10 of stamped or cast metal, which fits within the bore and finds a firm seat on the shoulder 7 within the gate. Obviously, the said initial sealing device may take the form of a flat disc, or a solid plug, or any other convenient shape, and if desired, the bore of the gate 6 may be tapered throughout to receive a correspondingly tapered cup or plug, in which latter event it may or may not be found necessary to back up the plug with a tamping or molding sand or the like.

Some of the advantages gained by the use of the sealing means described are as follows:

1. The plugging medium being of a solid, resistant material, such as metal, is not fragile, and is therefore not liable to rupture and contaminate the molten metal and thereby impair the weld;

2. The dimensions of the heating gate and the plugging means therefor being predetermined, the latter will be accurately positioned in the gate and will prevent the projection of the plugging means within the mold cavity;

3. When the initial plugging element is made of metal or the like, it will effect a distinct chilling action on the molten metal entering the sprue portion of the gate 6 and thereby preclude the possibility of the run-out of the molten metal;

4. The seal as a whole is of such a character as to prevent any portion of the seal or of the mold adjacent thereto breaking away and entering the mold cavity, to the consequent damage of the weld;

5. The plugging element, in contact with molten metal, is non-hygroscopic and will not absorb moisture.

What I claim is:

1. Means for sealing gates of welding molds comprising a metal cup adapted to be inserted and fitted bodily within the gate.

2. Means for sealing gates of welding molds comprising a solid resistant plugging device fitted bodily within the gate, and a backing of loose material filling the gate outside of the plugging device.

3. Means for sealing gates of welding molds comprising a metallic cup fitted bodily within the gate, and a backing of loose material filling the gate outside of said cup.

4. Means for sealing gates of welding molds comprising a gate having an interior shoulder near its inner end, a plug of resistant material fitting the gate and resting on said shoulder, and a body of molding sand tamped into the gate on top of said plug.

5. Means for sealing gates of welding molds comprising a gate having an interior shoulder near its inner end, and a metal plug fitting the gate and resting on said shoulder.

6. Means for sealing gates of welding molds comprising a gate having an interior shoulder near its inner end, and a cup of resistant material fitting the gate and resting on said shoulder.

7. Means for sealing gates of welding molds comprising a gate having an interior shoulder near its inner end, and a metal cup fitting the gate and resting on said shoulder.

8. Means for sealing gates of welding molds comprising a gate having an interior shoulder near its inner end, a metal cup fitting the gate and resting on said shoulder, and a body of molding sand tamped into the gate on top of the cup.

In testimony whereof I affix my signature.

EDWARD F. BEGTRUP.